Figure 1:
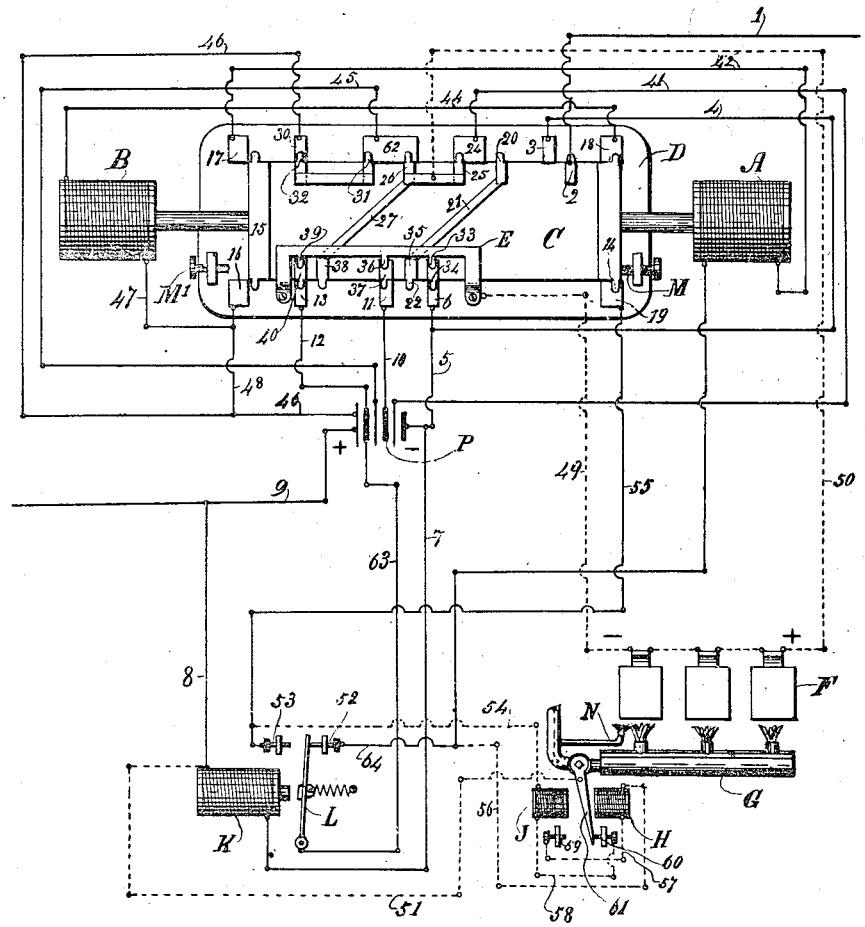

(No Model.) 3 Sheets—Sheet 1.

E. N. DICKERSON.
CHARGING AND DISCHARGING SECONDARY BATTERIES.

No. 565,727. Patented Aug. 11, 1896.

WITNESSES:

INVENTOR (No Model.) 3 Sheets—Sheet 2.
E. N. DICKERSON.
CHARGING AND DISCHARGING SECONDARY BATTERIES.
No. 565,727. Patented Aug. 11, 1896.
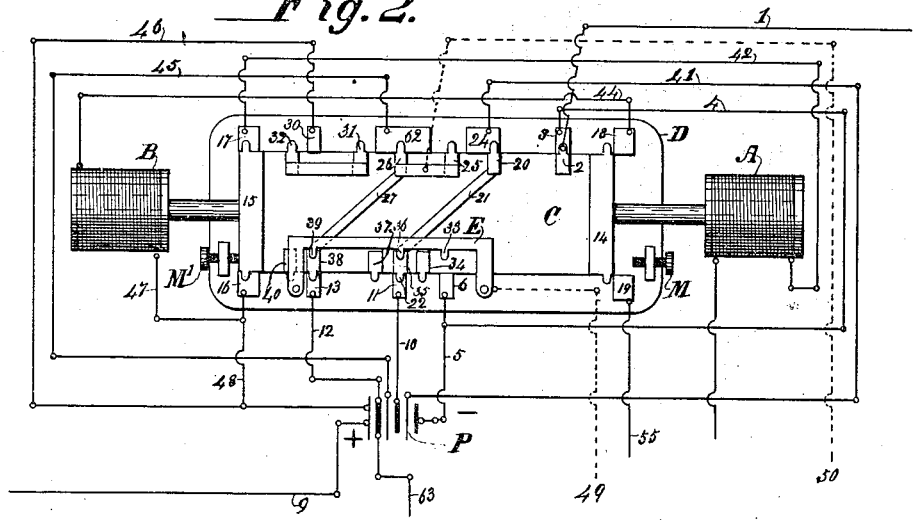
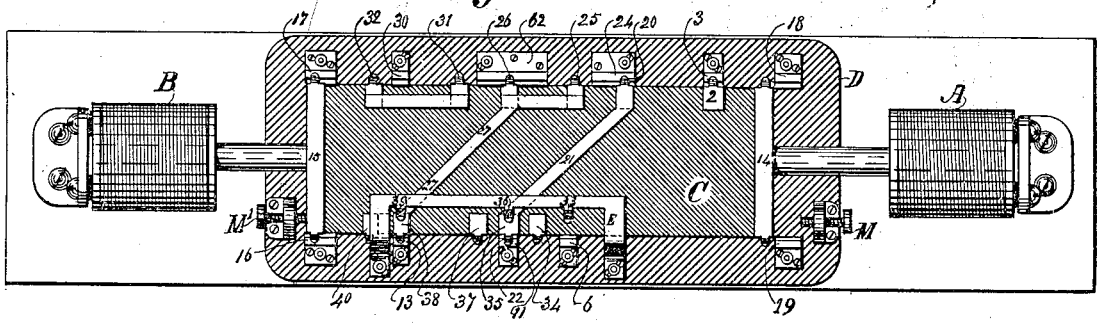
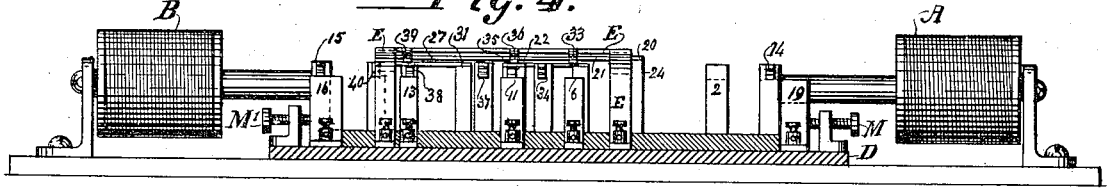
WITNESSES:
William A. Pollock
William M. Iliff
INVENTOR
E N Dickerson (No Model.) 3 Sheets—Sheet 3.
E. N. DICKERSON.
CHARGING AND DISCHARGING SECONDARY BATTERIES.
No. 565,727. Patented Aug. 11, 1896.
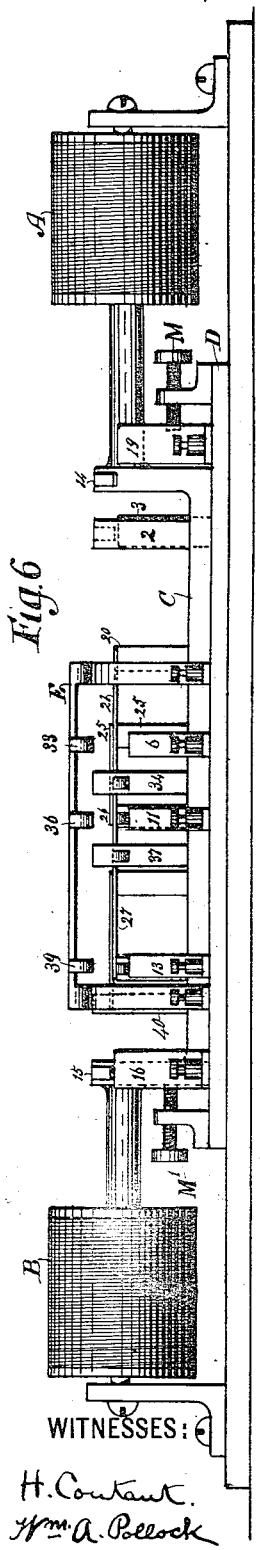
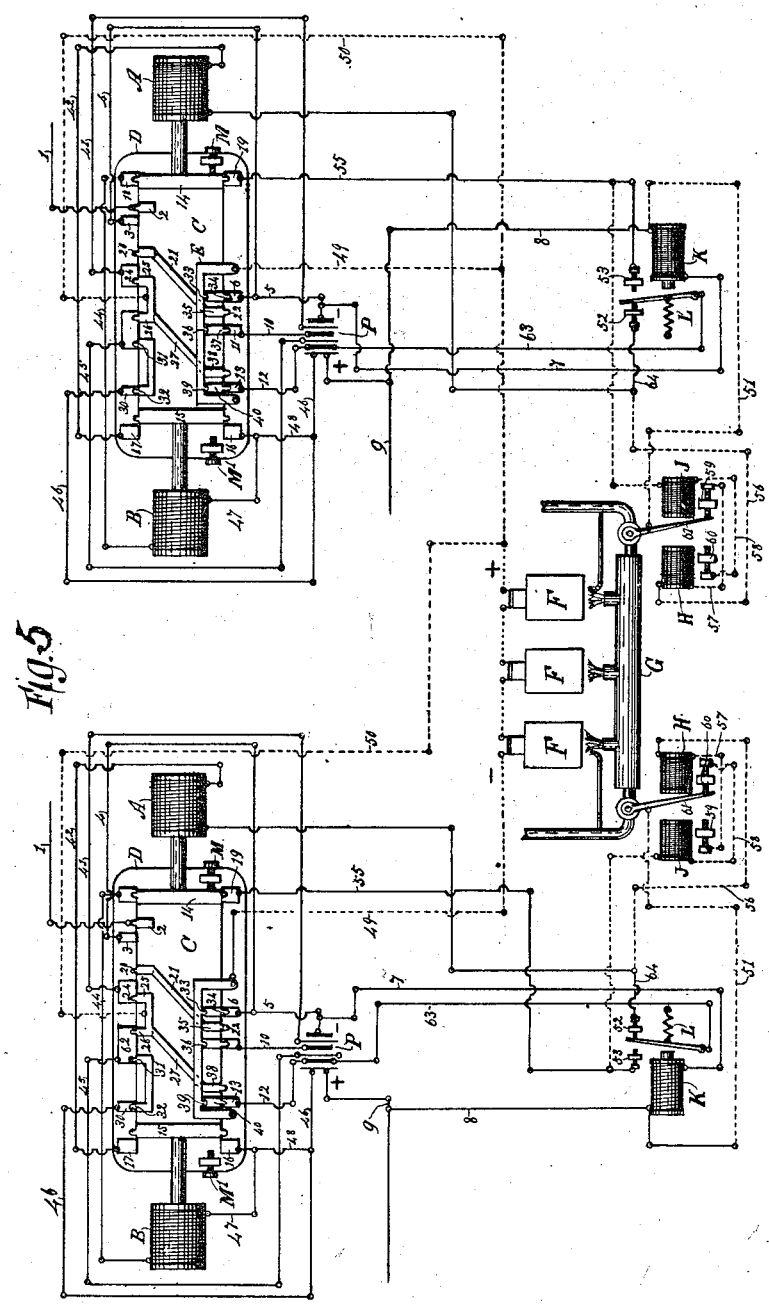
WITNESSES:
H. Contant.
Wm. A. Pollock
INVENTOR
E N Dickerson

UNITED STATES PATENT OFFICE.

EDWARD N. DICKERSON, OF NEW YORK, N. Y.

CHARGING AND DISCHARGING SECONDARY BATTERIES.

SPECIFICATION forming part of Letters Patent No. 565,727, dated August 11, 1896.

Application filed May 26, 1892. Serial No. 434,449. (No model.)

*To all whom it may concern:*

Be it known that I, EDWARD N. DICKERSON, of the city, county, and State of New York, have invented a new and useful Improvement in Apparatus for Charging and Discharging Secondary Batteries, of which the following is a full, true, and exact description, reference being had to the accompanying drawings.

This invention relates to an improvement in process and apparatus for alternately charging and discharging a secondary battery, and of changing the connections from multiple to series as the same may be required for that purpose; and it consists, further, in combining a thermopile or source of electricity operated by heat, as, for instance, gas, with electrical control from the secondary battery, whereby the said thermal source of electricity shall be put in operation whenever required by the battery for the purpose of charging.

It will be obvious that part of my invention is applicable to any source of electricity, whether thermal or otherwise; but it is especially applicable to a source of electricity like a thermopile, in which the current is of low tension but high voltage.

The general result of my invention when applied to such a combination is that the secondary battery is charged in multiple or parallel circuit whenever it reaches a certain point of discharge, which simultaneously puts the thermal source of electricity into operation, whereas when the said secondary battery is fully charged the source of heat is cut off and the circuits of the secondary battery are changed to series.

My invention will be readily understood from the accompanying drawings, in which—

Figure 1 represents a plan view of my apparatus in process of charging; Fig. 2, a view of the circuit-changing switch in process of discharging; Fig. 3, a view, more in detail, of the structure of said switch; Fig. 4, a side elevation of the same; and Fig. 5 represents a view of the connections where one thermobattery is used to charge two secondary batteries. Fig. 6 represents an elevation, on a larger scale, of the apparatus shown in Fig. 4; and Fig. 7, a plan view of the connections when a single thermopile is used to charge two secondary batteries.

In my drawings, P represents the secondary battery; C, the battery-circuit-controlling switch operated by two axial magnets A and B; F, the thermopile put in operation, as shown, by gas-flames from burner G, so arranged as to light one from the other. A small lighting jet N may be employed to light the gas in burner G when the same is turned on. The gas-control magnet is shown at J H and the switch-control magnet at K. The drawings are intended, however, only as general representations of the apparatus employed, the details of such structures being well known, as, for instance, the gas-control magnet J H, preferable to be used, would be one of the step-by-step automatic cut-out magnets simultaneously turning on and lighting the gas, of the general type patented to E. E. Bean, June 1, 1869, No. 90,629.

The secondary battery may be of any kind; but I prefer that patented to Isaiah L. Roberts (reissued Letters Patent) on the 26th day of April, 1892, No. 11,238, because the current of discharge from this battery is very steady until the same is almost discharged, when it drops suddenly, while at the same time, when charged, the voltage rises suddenly at the time when the battery is fully charged.

The battery-control switch C is movable upon a base D, which carries certain fixed electrical connections, the movable part C likewise carrying certain electrical movable connections for the purpose hereinafter to be described.

As shown in Fig. 1, the magnet A has last operated, drawing the switch C against the stop M, and the battery is in process of charging.

The current of electricity for charging the battery is derived from the thermopile F, flowing by the wires 49 50. The positive current passes by the wire 50 to the connections 25 26, which represent spring connections moving upon fixed plates in the frame of the switch. By the spring 25 the current passes to the plate 24, the wire 41, and so to the first positive plate of the battery P. By the spring 26 the current passes to the plate 62, to the wire 45, to the second positive plate, and by the same plate 62 to the spring 31, to the spring 32, through the plate 30 and wire 46 to the third positive pole of the battery.

It will of course be understood that the same principle is applied to charging any number of plates or poles which may be desired.

The negative current from the thermopile F passes by wire 49 to fixed plate E, carried upon the frame of the apparatus and having springs 33, 36, and 39 bearing upon moving plates in the moving switch C. Said negative current passes by the plate E, through spring 33, through plate 34 and its spring, to plate 3, to wire 5, to the first negative plate; from the same frame E by spring 36, through plate and spring 37 to plate 11 and wire 10, to the second negative pole of the battery; through the same frame E by spring 39, plate and spring 40, to plate 13, wire 12, and the third negative pole of the battery. During the process of charge the main line 1 is broken at spring 2, whereas in discharge when the switch is moved in the opposite direction the said main line is connected by spring 2, plate 3, wire 4, wire 5 to the negative pole of the battery. The said battery P is connected by its opposite pole to the control-magnet K, the armature L of which during the process of discharge remains in the back position. When the battery P is charged, the armature L is drawn forward, when a current from the left-hand cell or cells of the battery P flows as follows: Through wire 63 to armature L, to contact-point 53, through wire 55, through fixed plate 19, through spring-contact 14, through plate 18, through wire 44, to magnet B, through wire 47, through wire 48, and wire 46 to the other pole of said cell of battery, thereby putting in operation the magnet B, which throws the movable switch into the position shown in Fig. 2, which movement, as will be observed, simultaneously cuts the circuit between 19, 14, and 18 and makes a circuit between 16, 15, and 17, ready to again operate the magnet A, as will be explained.

Of course it is not necessary that the connections 14 and 15 should break the circuit at both ends. The said plates 14 and 15 might, for instance, be permanently connected with wires 44 and 42, respectively, and the plates 17 and 18 dispensed with.

When the armature L has been drawn forward by the charging of the battery P, it also turns out the gas in the burner G. In this case the current, passing through wire 63 to armature L, passes through the front contact 53, through wire 54 to magnet J, to wire 58, to contact-point 60, to armature 61, through wire 51, through wire 8, through wire 9 to battery, and the armature 61 being thrown to the left cuts off the gas, simultaneously breaking the circuit through contact-point 60. When the switch C is thrown to the left, the circuits of the battery P, previously arranged in parallel, are shifted to series, as shown in Fig. 2. In this case the circuit passes from line 1 to the first negative pole, as previously explained, thence through battery to first positive pole, through wire 41, spring 20, cross connection 21, plate and spring 35 22 to plate 11, to the next negative pole of the battery; from the next positive pole through wire 45, to plate 62, to spring 26, cross connection 27, spring 38, to plate 13, wire 12, and the next negative pole of the battery, the final positive pole connecting by wire 9 to line. It will be observed that simultaneously the parallel circuits of the battery have all been broken.

It is understood, of course, that the connections 33 36 39 on the frame E make contact only in the position shown in Fig. 1 and do not make contact in the position shown in Fig. 2, the plates 34, 37, and 40 being higher above the level of the plate C than are the plates 35 and 38.

When the battery has been discharged, its potential falls so that the armature L is drawn back by its spring against contact 52, when the circuit is completed from battery through wire 64, magnet A, wire 42, plate 17, switch 15, plate 16, wire 48, to wire 46, to battery, and simultaneously by wire 64, magnet H, wire 57, contact 59, armature 61, wire 51, wire 8, wire 9 to battery, thereby throwing the armature 61 to the right, turning on the gas, setting the thermopile in operation, and moving the switch to the position shown in Fig. 1, ready to repeat the operation.

It is, of course, to be understood that the magnet K is wound with so high resistance as to cause no substantial loss from the battery P. The operation of the other magnets being only instantaneous the amount of electricity consumed by them is very trifling.

It is, of course, understood that other means of operating the switch C and of constructing the same may be readily devised and still be within the limits of my invention.

It is obvious that for some purposes the switch C can be operated by hand.

In Fig. 5 connections are shown by means of which the same thermopile may be used for charging two secondary batteries. In this case the wires 50 79 lead to the second secondary battery, and the magnets J H, relays K L K L, connecting-wires, and other parts (shown in Fig. 1) are duplicated, so that when either or both secondary batteries require charging the thermopile is put in operation in the same manner as heretofore described. When both are charged, the gas is cut off from both ends of the burner G in the manner previously described by the two electrically-operated stop-cocks shown in Fig. 5 and the thermopile ceases its operation.

In Fig. 7 a full arrangement of the circuits shown in Fig. 5 is indicated.

Similar letters refer to similar circuits on the two sides of the drawings.

What I claim as my invention, and desire to secure by Letters Patent, is—

1. The combination of a secondary battery, an automatic switch for connecting its cells in series or multiple, a source of electricity connected with said switch, and mechanism for automatically cutting off the source of electricity and shifting the battery-switch from multiple to series when the desired potential of the battery has been reached, substantially as described.

2. The combination of a thermopile, a secondary battery, a reciprocating switch, a double-contact relay, a second switch controlling the thermopile, and electric connections between all of said elements, whereby the poles of said battery are connected in multiple and the thermopile deënergized when the reciprocating switch is at one limit of its traverse, and said poles are shifted to series and the thermopile energized when the reciprocating switch is in its opposite position, substantially as described.

In testimony whereof I have signed my name to this specification in the presence of two subscribing witnesses.

E. N. DICKERSON.

Witnesses:
T. A. CONTANT,
ANTHONY GREF.